United States Patent
Hong et al.

(10) Patent No.: US 11,360,666 B2
(45) Date of Patent: Jun. 14, 2022

(54) RECONFIGURABLE STORAGE CONTROLLER, STORAGE DEVICE, AND METHOD OF OPERATING STORAGE DEVICE

(71) Applicant: SAMSUNG ELECTRONICS CO., LTD., Suwon-si (KR)

(72) Inventors: Jung Hyun Hong, Hwaseong-si (KR); Young Jin Cho, Seoul (KR); Hyeok Jun Choe, Hwaseong-si (KR); Young Geon Yoo, Seoul (KR); Chan Ho Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 16/862,267

(22) Filed: Apr. 29, 2020

(65) Prior Publication Data

US 2021/0109655 A1   Apr. 15, 2021

(30) Foreign Application Priority Data

Oct. 14, 2019   (KR) .................... 10-2019-0126908

(51) Int. Cl.
*G06F 3/06*   (2006.01)
(52) U.S. Cl.
CPC .......... *G06F 3/0604* (2013.01); *G06F 3/0658* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 6,078,736 A | 6/2000 | Guccione | |
| 6,326,806 B1 | 12/2001 | Fallside et al. | |
| 7,017,061 B2* | 3/2006 | Lippert | G06F 1/30 713/320 |
| 7,272,730 B1* | 9/2007 | Acquaviva | G06F 1/3203 713/300 |
| 7,482,836 B2 | 1/2009 | Levi et al. | |
| 7,599,299 B2 | 10/2009 | Goetting et al. | |
| 8,489,905 B2 | 7/2013 | Smith, III et al. | |
| 8,862,854 B2 | 10/2014 | Vaidyanathan et al. | |
| 9,411,528 B1 | 8/2016 | Mcgarry et al. | |
| 9,542,198 B2 | 1/2017 | Pattichis et al. | |
| 2009/0307696 A1* | 12/2009 | Vais | G06F 9/4893 718/102 |
| 2012/0136489 A1* | 5/2012 | Wang | H05K 7/20836 700/282 |
| 2014/0089699 A1* | 3/2014 | O'Connor | G06F 1/3243 713/322 |
| 2020/0201740 A1* | 6/2020 | Peipelman | G06F 11/3457 |

\* cited by examiner

*Primary Examiner* — Elias Mamo
(74) *Attorney, Agent, or Firm* — Volentine, Whitt & Francos, PLLC

(57) ABSTRACT

A storage controller includes a host interface which real-time analyzes a command received from a host, a programmable logic unit which loads an optimal image adaptively selected from a plurality of images in response to at least one of a current operating state of the storage controller and the command, and a processor which performs an operation on a nonvolatile memory device using the programmable logic unit after the optimal image is loaded.

20 Claims, 9 Drawing Sheets ically "communicating") various command(s),
RECONFIGURABLE STORAGE CONTROLLER, STORAGE DEVICE, AND METHOD OF OPERATING STORAGE DEVICE This application claims the benefit of Korean Patent Application No. 10-2019-0126908 filed on Oct. 14, 2019 in the Korean Intellectual Property Office, the subject matter of which is hereby incorporated by reference.

BACKGROUND

1. Field

The inventive concept relates generally to storage controllers, storage devices, methods of operating a storage controller, and methods of operating a storage device.

2. Description of the Related Art

Various storage devices may be used to store and retrieve data under the control of a host device. There are many different types of host devices, such as computers, smartphones, smart pads, etc. There are also many different types of storage devices, such as hard disk drives (HDDs), solid state drives (SSDs), memory cards, etc. However, most contemporary storage devices use one or more semiconductor memories, particularly including nonvolatile memories. Nonvolatile memories include read-only memories (ROMs), programmable ROMs (PROMs), erasable PROMs (EPROMs), electrically erasable PROMs (EEPROMs), flash memories, phase-change random access memories (PRAMs), magnetic RAMs (MRAMs), resistive RAMs (RRAMs), and ferroelectric RAMs (FRAMs).

The development of improved semiconductor fabrication technologies has allowed notable increases in the speed with which any host devices are able to communicate information with storage devices. Such information includes increasingly voluminous content data. The requirements to receive and write (and/or read and provide) such large volumes of information at high speed place serious demands on storage devices. Accordingly, storage devices may be efficiently capable of reconfiguration to ensure appropriate use of hardware resources.

SUMMARY

Aspects of the inventive concept relate to more efficiently using internal resources of a storage device in response to an optimal image loaded into a programmable logic unit. The programmable logic unit may be adaptively reconfigured in response to a command, without interference by a host.

However, aspects of the inventive concept are not restricted to those specifically set forth herein. The above and other aspects of the present disclosure will become more apparent to one of ordinary skill in the art upon consideration of the subject disclosure together with the accompanying drawings.

In one aspect, the inventive concept provides a storage controller including a host interface which real-time analyzes a command received from a host, a programmable logic unit which loads an optimal image adaptively selected from a plurality of images in response to at least one of a current operating state of the storage controller and the command, and a processor which performs an operation on a nonvolatile memory device using the programmable logic unit after the optimal image is loaded.

In another aspect, the inventive concept provides a method of operating a storage device including a storage controller and a nonvolatile memory device. The method includes; real-time analyzing a command received from a host, determining whether or not a current operating state of the storage device is suitable for performing the command, if the current operating state of the storage device is suitable for performing the command, operating the storage device using the current operating state, else changing the operating state of the storage device, and generating a result output and communicating the result output to the host.

In another aspect, the inventive concept provides a storage device including; a nonvolatile memory device and a storage controller which receives a command from a host. The storage controller includes an internal memory, a programmable logic unit, a processor configured to control operation of the storage device and access the internal memory, and a nonvolatile memory device (NVM) controller configured to control operation of the nonvolatile memory device, wherein the storage controller is configured to select an optimal image from a plurality of images in response to an analyzing of a pattern of the command, and load the optimal image into the programmable logic unit, and the processor is further configured to control operation of the storage device in response to the optimal image.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Certain embodiments of a storage controller, a storage device, as well as methods of operating a storage device according to embodiments of the inventive concept will be described in some additional detail with reference to FIGS. 1 through 9, inclusive.

Figure 1:
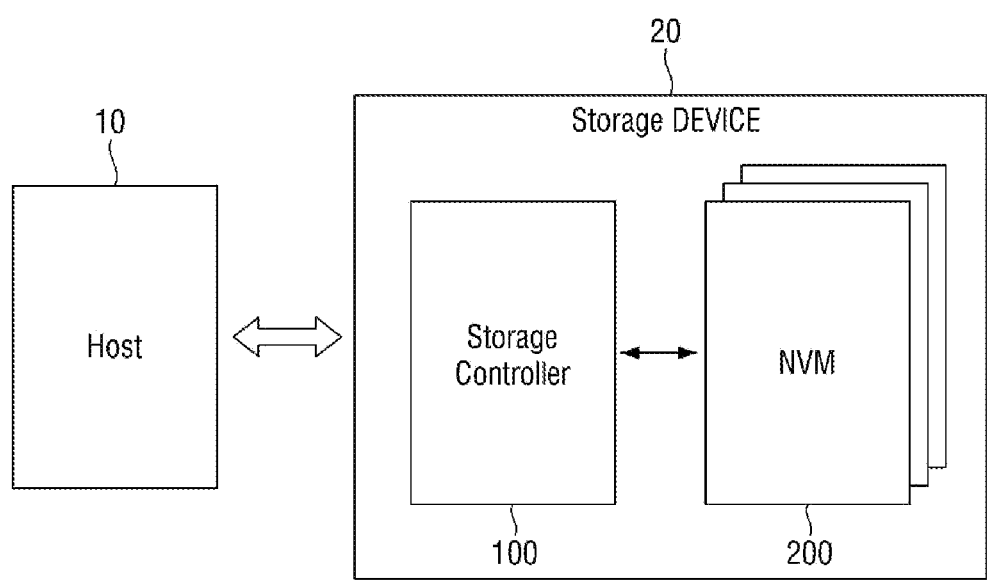
FIG. 1 is a block diagram of a storage system according to embodiments of the inventive concept.
Figure 2:
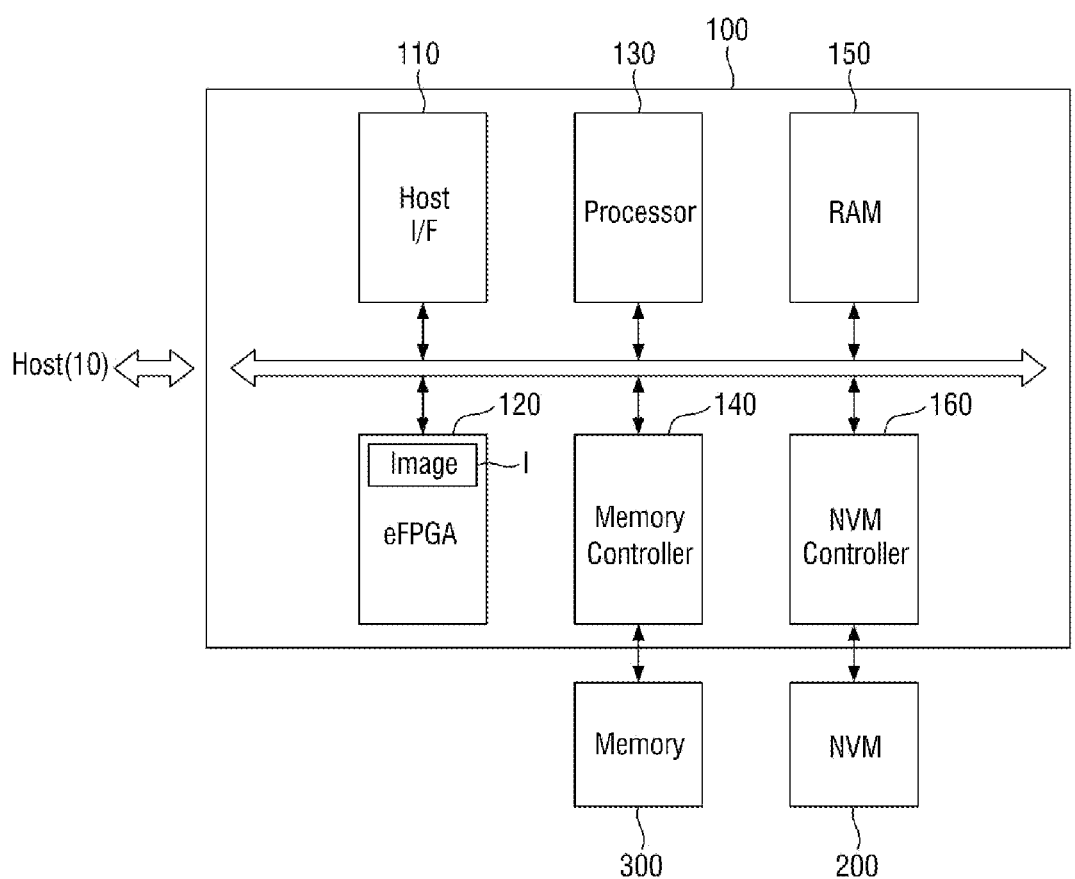
FIG. 2 is a block diagram further illustrating in one example the storage controller 100 of FIG. 1.

FIG. 1 is a block diagram illustrating a storage system according to an embodiment of the inventive concept. FIG. 2 is a block diagram further illustrating in one example a storage controller 100 of FIG. 1.

The storage system illustrated in FIGS. 1 and 2 generally includes a host 10 and a storage device 20, which are mutually capable of transmitting and/or receiving (hereafter, generically "communicating") various command(s), addresses(es) and/or data using one or more interfaces. For example, the host 10 may communicate a command and associated data to the storage device 20 requesting that the storage device 20 perform a data access operation, such as a read operation, a write operation, or an erase operation. Alternately, the host 10 may request that the storage device 20 perform another type of operation, such as a housekeeping operation, among possibly many other types of operations.

Here, the host 10 may be a central processing unit (CPU), a processor, a microprocessor, an application processor (AP), etc. In certain embodiments of the inventive concept, the host 10 may be implemented as a system-on-chip (SoC).

Information may be communicated between the host 10 and the storage device using one or more interface(s), such as the advanced technology attachment (ATA), serial ATA (SATA), external SATA (e-SATA), small computer small interface (SCSI), serial attached SCSI (SAS), peripheral component interconnection (PCI), PCI-express (PCI-E), IEEE 1394, universal serial bus (USB), secure digital (SD) card, multimedia card (MMC), embedded multimedia card (eMMC), and compact flash (CF) card interfaces.

The storage system may be, as examples, a solid state drive (SSD), an eMMC, a universal flash storage (UFS), a compact flash (CF), a secure digital (SD), a micro-SD, a mini-SD, an extreme digital (xD), a memory stick, etc.

With the foregoing configuration, the host 10 may be used to control the performing (or execution) of various operations by the storage device 20 through the one or more interface(s).

As illustrated in FIG. 1, the storage device 20 may include the storage controller 100 and a nonvolatile memory devices 200. In some embodiments, each of the nonvolatile memory devices 200 may include a flash memory or a resistive memory such as a resistive random access memory (ReRAM), a phase-change RAM (PRAM) or a magnetic RAM (MRAM). Alternatively, each of the nonvolatile memory devices 200 may include an integrated circuit including a processor and a RAM, for example, may include a storage device or a processing in memory (PIM).

In some embodiments, a flash memory included in each of the nonvolatile memory devices 200 may be a two-dimensional (2D) or three-dimensional (3D) memory array. In the 3D memory array memory devices, an active region is disposed on a silicon substrate and circuits related to the operation of memory cells are formed on the substrate or in the substrate and the 3D memory array are monolithically formed at least one physical level. The term "monolithic" denotes that a layer at each level of an array are directly stacked on a layer at each lower level of the array. The 3D memory array includes vertical NAND strings which are vertically oriented such that at least one memory cell is located over other memory cells. The at least one memory cell may include a charge trap layer.

The storage controller 100 may be used to control the execution of an operation by each of the nonvolatile memory devices 200. In some embodiments, the storage controller 100 may be connected to each of the nonvolatile memory devices 200 through at least one channel in order to directly communicate information (e.g., data). According to embodiments, the storage controller 100 may be an element included in a storage device such as an SSD or a memory card.

Referring to FIG. 2, the storage controller 100 may include a host interface 110, a programmable logic unit 120, a processor 130, a memory controller 140, a RAM 150, and a nonvolatile memory (NVM) controller 160.

The host 10 may provide one or more commands CMD and associated address(es) and data to control the execution of various data access operations, as well as memory management operations, etc.

The host interface 110 may be configured to provide at least one communication connection between the host 10 and the storage device 20, such that various command(s), address(es) and/or data may be communicated to execute a desired operation.

Consistent with the example illustrated in FIG. 2, certain embodiments of the inventive concept may use the host interface 110 of the storage controller 100 to real-time analyze a command received from the host 10. In this context, the term "real-time analyze" means the host interface 110 will process a received command as soon as received from the host 10 without materially delaying the processing or storing the command prior to processing.

Additionally or alternatively, the host interface 110 may be used to real-time communicate an operating state of the storage device 20 to the host 10. Here, the term "real-time communicate" means the host interface 110 will communicate the operating state of the storage device without necessarily storing the operating state information or waiting for a specific request from the host 10.

Alternately or additionally, the host interface 110 may be used to analyze a pattern of command(s) received from the host 10. For example, an analyzed pattern of command(s) may denote change(s) in the use, request, execution and/or sequence of one or more command(s) in response to change(s) in the operating state of the storage device 20.

In some embodiments, the programmable logic unit 120 may be embedded-field programmable gate arrays (eFPGAs). Thus, the programmable logic unit 120 may include a configurable logic block (CLB), an input output block (IOB), and a configurable connection circuit which connects the CLB and the IOB. Here, the programmable logic unit 120 may be used to perform an operation in response to a loaded image T. In certain embodiments of the inventive concept, the programmable logic unit 120 may be a programmable logic device (PLD), such as those widely used to design digital circuits that perform a specific operation according to an image. The term "image", as used herein, denotes a hardware/software image of a specific operation performed by the programmable logic unit 120 and may be referred to as a bit stream, a kernel, or a lookup table according to various embodiments.

The storage device 20 may be used to store a plurality of images. Each of the images may be a program for each of the various situations in which the storage device 20 operates based on the operating state of the storage device 20 or a command received from the host 10.

In the example illustrated in FIG. 1, the processor 130 may be used to control the overall operation of the storage controller 100. That is, the processor 130 may control the execution of data access operations by the nonvolatile memory devices 200, the communication of information related to the execution of the data access operations (e.g., information communicated between storage controller 100 and the host 10, and the operation of the storage controller 100 itself. In this regard, the processor 130 may control the operation of the host interface 110, the programmable logic unit 120, the memory controller 140, the RAM 105, and/or the NVM controller 160.

Thus, the processor 130 may perform a control operation associated with the operation of the programmable logic unit 120. According to embodiments, the processor 130 may dynamically manage power applied to the storage controller 100 in response to the operation of the programmable logic unit 120 in order to effectively dynamically manage associated with the operation of the nonvolatile memory devices 200.

In certain embodiments of the inventive concept like the one illustrated in FIG. 2, the memory controller 140 may be connected to a memory 300, and the storage controller 100 may temporarily store data received from the host 10 in the memory 300, provide the stored data to the nonvolatile memory devices 200, and/or provide data read from the nonvolatile memory devices 200 to the host 10.

According to embodiments, the memory 300 may be a buffer memory. According to embodiments, the memory 300 may include a cache, a read-only memory (ROM), a programmable ROM (PROM), an erasable PROM (EPROM), an electrically erasable PROM (EEPROM), a PRAM, a flash memory, a static random access memory (RAM) (SRAM), or a dynamic RAM (DRAM). The memory 300 may be integrated into the storage controller 100 as an internal memory or may exist outside the storage controller 100 according to embodiments. The memory 300 may store preset information, programs, or commands related to the operation or state of the storage controller 100.

The RAM 150 may be used as an internal working memory and may be implemented as various memories. According to embodiments, the RAM 150 may be a volatile memory or a nonvolatile memory. For example, the RAM 150 may be implemented as at least one of a cache, a DRAM, an SRAM, a PRAM, an MRAM, an RRAM, and a flash memory device.

The NVM controller 160 may access each of the nonvolatile memory devices 200 and control the operation of each of the nonvolatile memory devices 200.

According to certain embodiments, the NVM controller 160 may include an advanced encryption standard (AES) module. Each of the nonvolatile memory devices 200 may store AES-encoded data as security data. The processor 130 may compare AES-decoded data with predetermined data and determines whether AES decoding has been successful based on the comparison result. Each of the nonvolatile memory devices 200 may store information about whether security decoding (AES decoding) has been performed successfully in a register (not illustrated) as result data of the security decoding.

Alternately or additionally, the NVM controller 160 may include a randomization circuit RND for removing pattern dependency of data. The randomization circuit may provide randomized data by performing randomization using seed values corresponding to a target page during a write operation. In addition, the randomization circuit may provide de-randomized data by performing de-randomization using seed values corresponding to a source page during a read operation.

Alternately or additionally, the NVM controller 160 may include an error correction code (ECC) engine. The ECC engine may perform error bit correction and include an ECC encoder and an ECC decoder. The ECC engine may perform error bit correction in data units of an ECC sector.

Each of the nonvolatile memory devices 200 may include a memory cell array, a row select circuit, a page buffer circuit, a column select circuit, a data processor, an input/output interface, and control logic. Here, the memory cell array may include a plurality of memory cells connected to a plurality of word lines WL and a plurality of bit lines BL, respectively. The memory cells may be NAND or NOR flash memory cells according to embodiments and may be arranged in a 2D array structure or a 3D vertical array structure according to embodiments. According to embodiments, the memory cells may be various types of resistive memory cells.

According to embodiments, each of the memory cells may be a single level memory cell (SLC) which stores one data bit or a multi-level memory cell (MLC) which stores a plurality of data bits.

Figure 3:
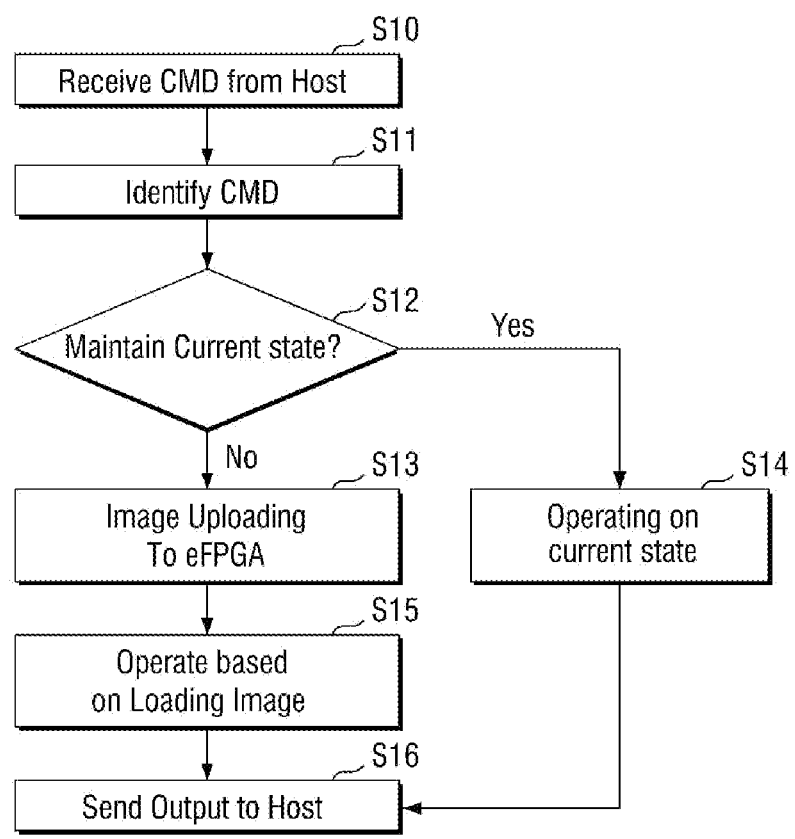
FIGS. 3, 4 and 5 are respective flowcharts flowchart illustrating various methods of operating a storage controller according to embodiments of the inventive concept.

FIG. 3 is a flowchart illustrating a method of operating a storage controller according to embodiments of the inventive concept.

Referring to FIGS. 2 and 3, the storage controller 100 receives a command from the host 10 (S10), and analyzes it to identify the command (S11). The storage controller 100 may be used to monitor in real-time, a current operating state of the storage device 20 (S12).

If the current operating state of the storage device 20 is suitable for performing the received command (S12=YES)—that is, is the current operating state is characterized by a resource distribution appropriate to the execution of the received command—the storage controller 100 will maintain the current operating state (S14) (e.g., continue with (or operating on) the current operating state).

However, if the current operating state of the storage device 20 is not suitable for performing the received command (S12=NO), the storage controller 100 will set about changing the operating state to one more suitable (e.g., perform the method steps S13, S14 and S15 described hereafter, as one example). This changing of the operating state may be understood in certain aspects as a redistribution of internal hardware resources within the storage controller 100 and/or the nonvolatile memory devices 200.

For example, the storage controller 100 may adaptively select a more "optimal" (e.g., best adapted) image from the plurality of images stored in the storage device 20. In this regard, the selection of the optimal image may be based on the current operating state of the storage device 20 and/or the command received from the host 10. According to various embodiments, at least one of the plurality of images may be stored in at least one of the RAM 150, the buffer memory 300, and/or nonvolatile memory devices 200 of the storage controller 100.

In certain embodiments of the inventive concept, the storage controller 100 may select the optimal image corresponding to a resource input state most efficient (or appropriate) for the performing of the received command from the plurality of stored images. Once selected, the optimal image may be loaded into the programmable logic unit 120. Here, the selecting and loading of the optimal image may involve using the host interface 110, the programmable logic unit 120, and/or the processor 130.

Returning to FIG. 3, the programmable logic unit 120 may load the optimal image to better control the operating state of the storage controller 100. That is, in certain embodiments, the programmable logic unit 120 may be used to dynamically manage power consumption by reconfiguring hardware resources of the storage controller 100 in accordance with (or in response to) the optimal image (S15), and in certain embodiments, the programmable logic unit 120 may dynamically manage power independently for each one of a plurality of hardware modules included in the storage device 20. In this regard, in certain embodiments, the terms "independently" or "independent" mean without further intervention by the host 10 after communicating the command.

The storage controller 100 may communicate a result output indicating (or characterizing) its operating state following execution of an operation in accordance with the optimal image to the host 10 (S16). And in response, the host 10 may prepare a next operation in accordance with the result output.

Figure 4:
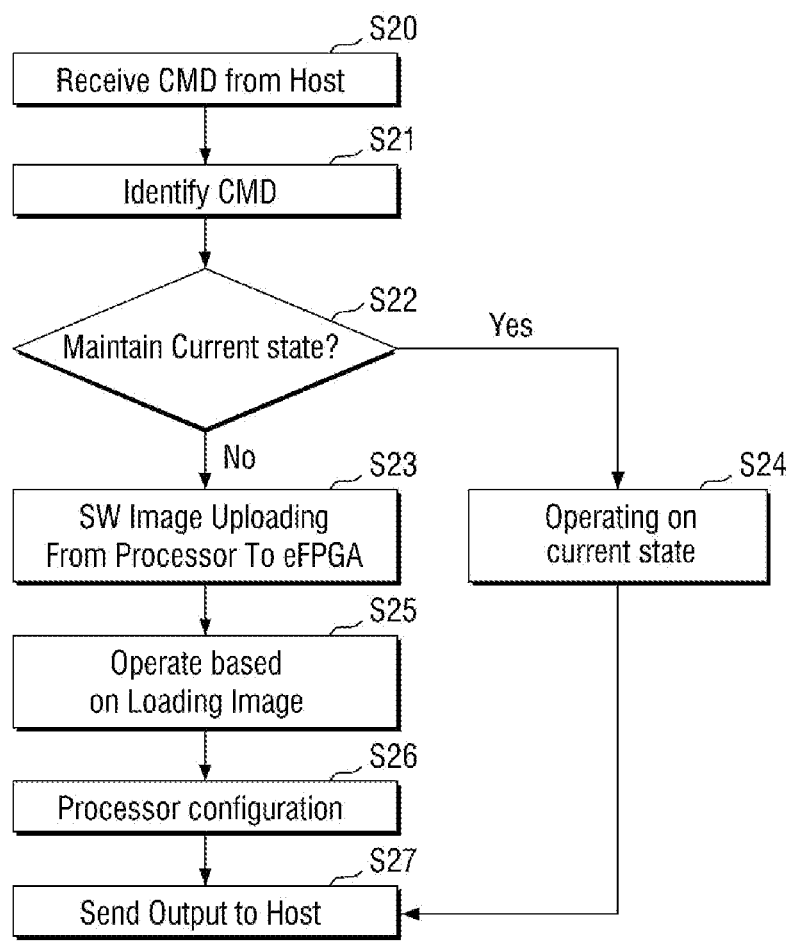

FIG. 4 is another flowchart illustrating a method of operating a storage controller according to embodiments of the inventive concept.

Referring to FIG. 4, the method steps S20, S21, S22, S24, S25 and S27 are respectively analogous to (or respectively the same as) the same as the method steps S10, S11, S12, S14, S15 and S17 of FIG. 3.

That is, if the current operating state of the storage device 20 is suitable for performing the received command (S22=YES)—that is, is the current operating state is characterized by a resource distribution appropriate to the execution of the received command—the storage controller 100 will maintain the current operating state (S24) (e.g., continue with (or operating on) the current operating state).

However, if the current operating state of the storage device 20 is not suitable for performing the received command (S22=NO), the storage controller 100 will set about changing the operating state to one more suitable (e.g., perform the method steps S23, S24 and S25 described hereafter, as one example). This changing of the operating state may be understood in certain aspects as a redistribution of internal hardware resources within the storage controller 100 and/or the nonvolatile memory devise 200.

For example, an optimal software-related (SW) image may be uploaded from the processor 130 to the eFPGA 120 (S23), and the storage controller 100 may be operated based on the loaded optimal image (S24) to reconfigure the processor 130 (S26) and generate a corresponding result output (S27).

As before, the storage controller 100 may adaptively select an optimal image from the plurality of stored images in response to the current operating state of the storage device 20 and/or the command received from the host 10. That is, the processor 130 may be sued to select the optimal image (e.g., an image corresponding to a resource input state most efficient to performing the received command from among the plurality of stored images) and load the selected optimal image into the programmable logic unit 120.

Once loaded (or updated) with the optimal image, the programmable logic unit 120 may be used to control the operation of the storage controller 100 in response to the optimal image (S25). Thus, in certain embodiments of the inventive concept, the programmable logic unit 120 may be used to dynamically manage power by reconfiguring resources of the processor 130 according to the optimal image (S26). For example, the loaded programmable logic unit 120 may be used to adjust (i.e., increase or decrease) the operating frequency of one or more components (e.g., clocks) within the processor 130 in response to command received from the host 10.

Then, the host interface 110 may be used to communicate the output result associated with operation in response to the optimal image to the host 10 (S27).

As described above, since the storage controller 100 may be used to control the operation of the processor 130 by adaptively changing an image according to the operating state of the storage device 20 and/or the received command, the processor 130 may be operated with optimal use of its constituent resource.

Figure 5:
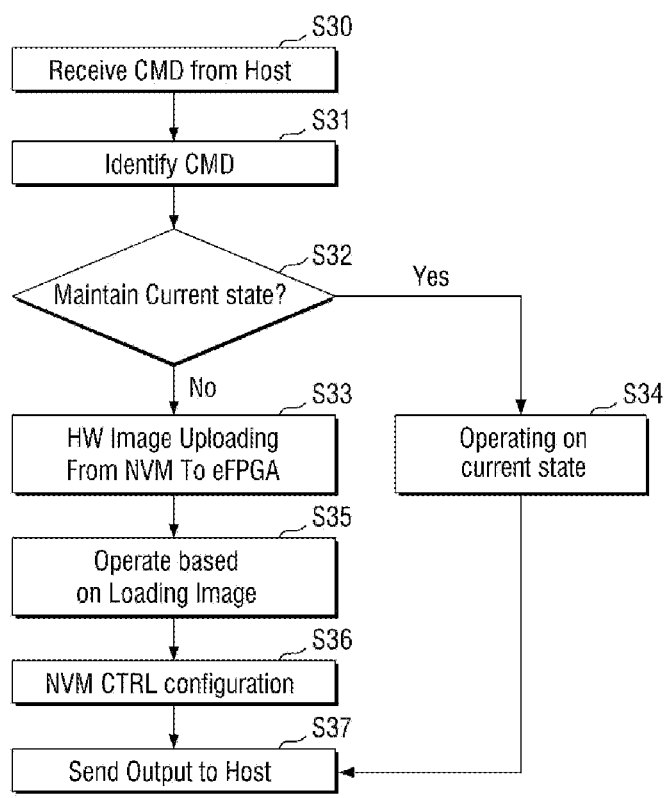

FIG. 5 is another flowchart illustrating a method of operating a storage controller according to embodiments of the inventive concept.

Referring to FIG. 5, the method steps S30, S31, S32, S34, S35 and 327 are respectively analogous to (or respectively the same as) the same as the method steps S10, S11, S12, S14, S15 and S17 of FIG. 3 or S20, S21, S22, S24, S25 and S27 of FIG. 4.

Here, however, an optimal hardware-related (HW) image may be uploaded from one or more of the nonvolatile memory devices 200 to the eFPGA 120 (S33). And following operation of the storage controller 100 in response to the uploaded image (S35), the NVM controller 160 may be reconfigured to provide a more optimal allocation (or definition) of resources (S36).

Thus, the programmable logic unit 120 may be used to dynamically control at least one of a power cutoff operation, a power supply voltage adjustment operation, an operating frequency adjustment operation, a randomizing operation, an error correction operation, and a compression operation associated with (or controlled by) the NVM controller 160.

In this manner, the programmable logic unit 120—after being loaded with an optimal image—may perform a control operation on the NVM controller 160 using the processor 130. According to embodiments, when as errors in the date read from the nonvolatile memory devices 200 increase, the NVM controller 160 may be responsively controlled to provide or change an error correction operation. According to embodiments, when the remaining memory capacity of the nonvolatile memory devices 200 is insufficient, the NVM controller 160 may be controlled to perform a data compression operation. According to embodiments, when input/output operations per second (IOPS) levels of the nonvolatile memory devices 200 get worse, the NVM controller 160 may be controlled to perform a high-performance arithmetic operation. According to embodiments, when any one of the nonvolatile memory devices 200 is not used for a predetermined period of time, the nonvolatile memory device 200 may be reduced in operating frequency or may be turned OFF (or alternately, may be turned ON). Alternately or additionally, the level of one or more power supply voltage(s) associated with the nonvolatile memory devices 200 may be adjusted.

Of note, the host interface 110 may be used to communicate information following operation in response to the optimal image and provide a corresponding result output to the host 10 (S37).

In this manner, since the storage controller 100 is enabled to control the operation of the nonvolatile memory devices 200 by adaptively changing an image in response to the current operating state of the storage device 20 and/or a command received from the host 10, the nonvolatile memory devices 200 may be made to operate with optimal resource allocations and/or operating state definitions (e.g., efficient power consumption).

FIGS. 6, 7, 8 and 9 are respective block diagrams illustrating in various embodiments the storage controller 100 according to embodiments of the inventive concept. For clarity of description, only material differences between these respective embodiments and the embodiment described in relation to FIG. 2 will be emphasized.

Figure 6:
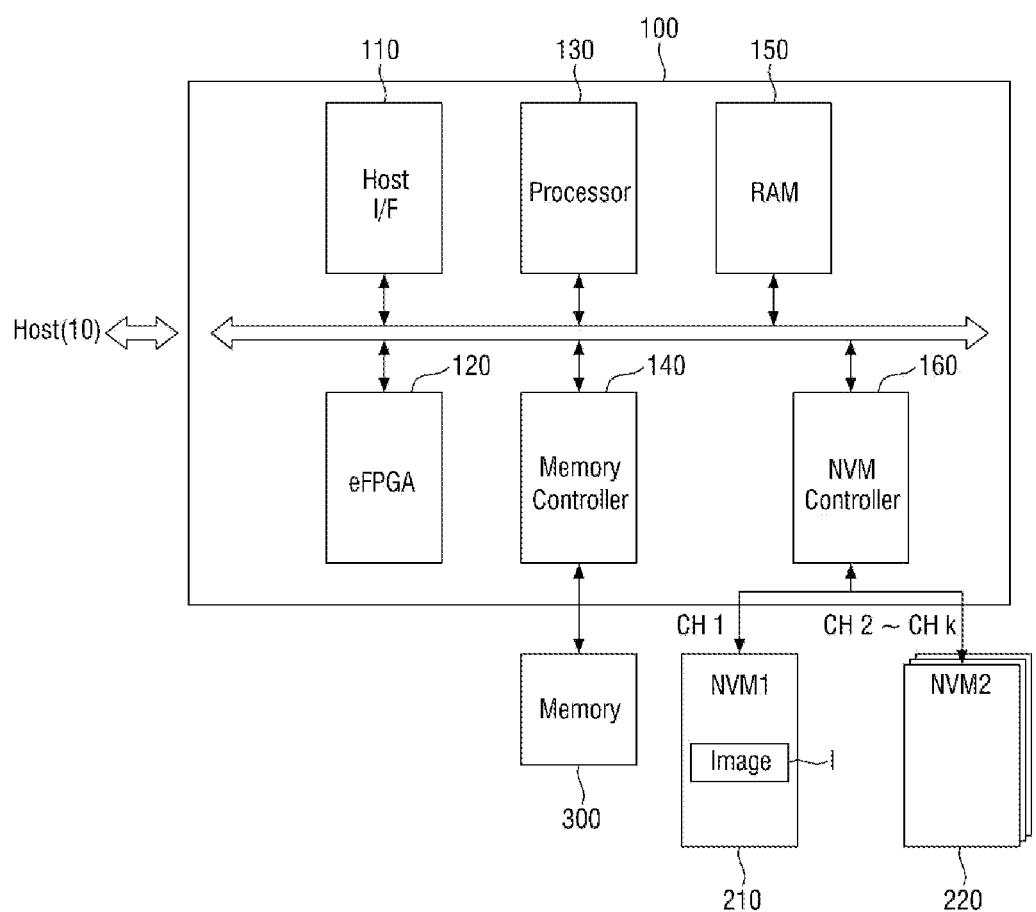
FIGS. 6, 7, 8 and 9 are respective block diagrams further illustrating in several examples the storage controller 100 of FIG. 1 according to embodiments of the inventive concept.

The general description of the nonvolatile memory devices 200 of FIG. 2 is replaced by a more detailed description in FIG. 6. Here, a plurality of images that may be loaded into the programmable logic unit 120 may be stored in a particular nonvolatile memory device 210 (NVM1) from among a plurality of nonvolatile memory devices including nonvolatile memory devices 220.

A plurality of nonvolatile memory devices 210 and 220 may be connected to (and accessed by) the storage controller 100.

According to embodiments, the nonvolatile memory devices 210 and 220 may be accessed by separate NVM controllers 160 or may be accessed by one NVM controller 160.

According to embodiments, a plurality of images I may be stored in any one 210 of the nonvolatile memory devices 210 and 220. An optimal image selected from the images I stored in the nonvolatile memory device 210 may be accessed by the NVM controller 160 through a channel CH1 and loaded into the programmable logic unit 120. Data requested to be read or written by a host 10 other than images may be accessed in the nonvolatile memory devices 220 through channels CH2 through CHk (where k is a natural number of 3 or more).

According to embodiments, the images I may be stored in at least one nonvolatile memory device 210 from among the nonvolatile memory devices 210 and 220. The at least one nonvolatile memory device 210 may be used to store the images I only and may not store other data. The images I stored in the at least one nonvolatile memory device 210 can only be read through the channel CH1 and cannot be written or erased by the host 10. In this case, the host 10 can read, write, and erase data only for the nonvolatile memory devices 220 connected through the channels CH2 through CHk.

According to embodiments, the storage controller 100 monitors the state of each of the nonvolatile memory devices 200 (210 and 220), and the programmable logic unit 120 controls an access operation to the nonvolatile memory devices 200 (210 and 220) according to a selected optimal image when performing a command received from the host 10.

Figure 7:
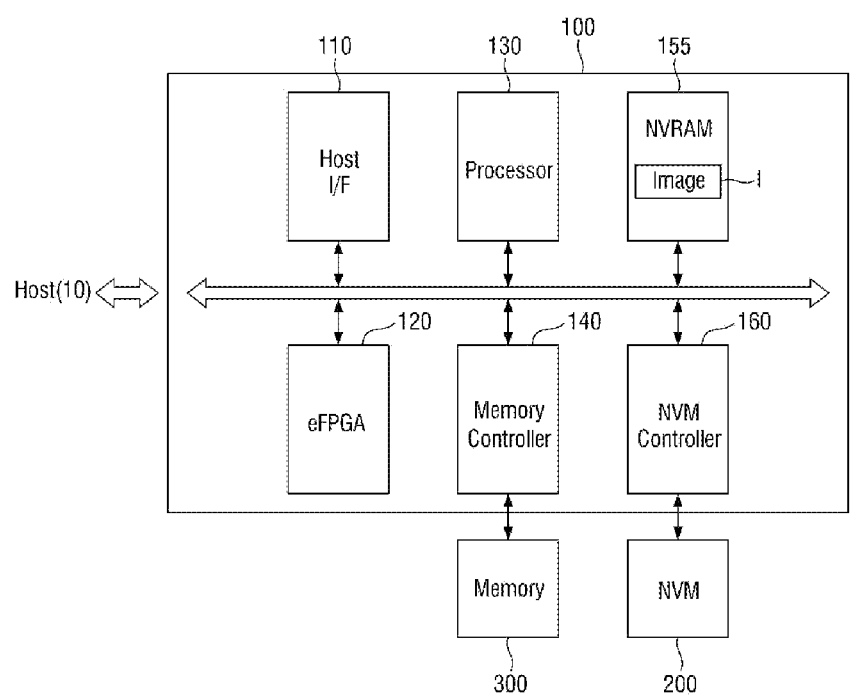

In FIG. 7, one or more images that may be loaded into the programmable logic unit 120 are stored in an internal memory 155 of the storage controller 100. According to embodiments, the internal memory 155 may include a nonvolatile memory and a volatile memory, and a plurality of images may be stored in the nonvolatile memory NVRAM. According to embodiments, the internal memory 155 may be a register, an MRAM, a PRAM, or the like.

Figure 8:
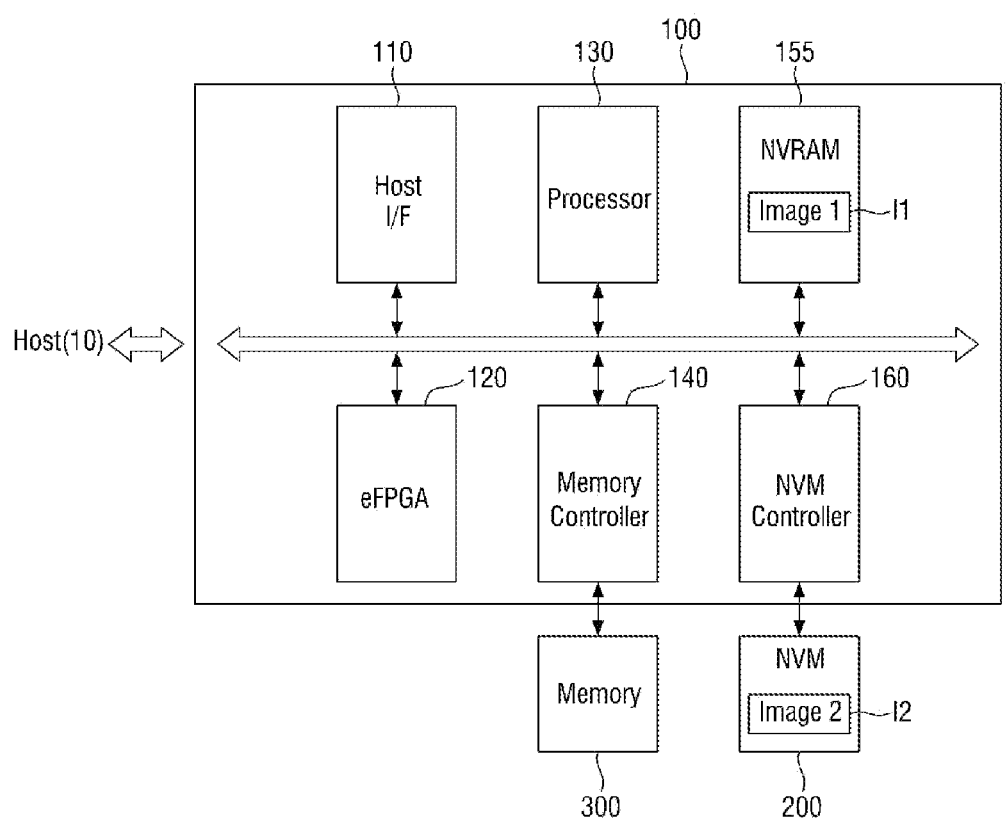

In FIG. 8, images that may be loaded into the programmable logic unit 120 include at least a first type image I1 and a second type image I2. According to embodiments, the first type image I1 and the second type image I2 may be distinguished according to data size, operating nature (or classification), a target of a control operation, etc.

The storage controller 100 may store the first type image I1 in the internal memory 155 as a bit stream having a small volume. In contrast, the storage controller 100 may store the second type image I2 in the nonvolatile memory devices 200 as a bit stream having a larger volume than a preset data volume.

Alternatively, the storage controller 100 may store the first type image I1 in the internal memory 155 to control the operation of certain hardware modules (e.g., one or more of the hardware components 110, 120, 130, 140 and 160 of FIG. 2) within the storage controller 100. Here, the internal memory 155 may be a nonvolatile RAM, such as a register, an MRAM, or a PRAM. The second type image I2 may be stored in the nonvolatile memory devices 200 to control the operation of each of the nonvolatile memory devices 200, and/or to control the operation of the NVM controller 160.

Figure 9:
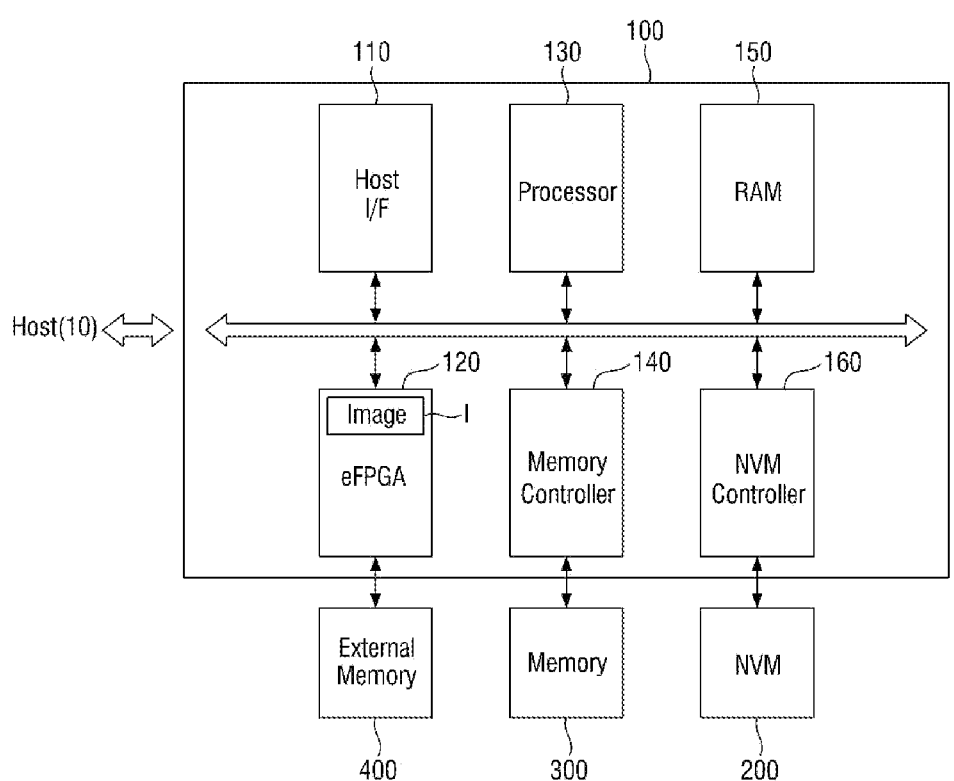

In FIG. 9, images that may be loaded into the programmable logic unit 120 may be stored in an external memory 400 associated with the storage controller 100. Here, the external memory 400 is shown directly connected to the programmable logic unit 120, but this is just one possible configuration.

The external memory 400 may be a nonvolatile memory, a buffer memory, or a register according to embodiments. The external memory 400 may store a plurality of images to be loaded into the programmable logic unit 120. The programmable logic unit 120 may operate by loading any one image from the external memory 400.

As described above, a storage controller consistent with embodiments of the inventive concept may be used to efficiently reallocate and/or redefine hardware resources in response to a current operating state of the storage controller in view of a command received from a host. The storage controller may real-time analyze the received command and dynamically manage the operating characteristics (e.g., power consumption) of the storage controller and/or associated storage devices without intervention by the host (i.e., independently).

While the inventive concept has been particularly shown and described with reference to exemplary embodiments thereof, it will be understood by those of ordinary skill in the art that various changes in form and detail may be made therein without departing from the spirit and scope of the present disclosure as defined by the following claims.

What is claimed is:

1. A storage controller, comprising:
a host interface which real-time analyzes a command received from a host;
a programmable logic unit which loads an optimal image adaptively selected from a plurality of images in response to at least one of a current operating state of the storage controller and the command; and
a processor which performs an operation on a nonvolatile memory device using the programmable logic unit after the optimal image is loaded.

2. The storage controller of claim 1, wherein the operation dynamically manages power consumption by at least one of the storage controller and the nonvolatile memory device.

3. The storage controller of claim 1, wherein the programmable logic unit analyzes a pattern of the command and selects the optimal image from among the plurality of images in response to the analyzed pattern of the command.

4. The storage controller of claim 1, wherein at least one of the images is stored in the nonvolatile memory device.

5. The storage controller of claim 1, wherein the storage controller comprises a nonvolatile memory controller which controls operations on the nonvolatile memory device, and
the operation performed by the processor dynamically changes at least one of a power cutoff operation, a power supply voltage adjustment operation, an operating frequency adjustment operation, a randomizing operation, an error correction operation, and a compression operation.

6. The storage controller of claim 1, wherein the plurality of images includes a first type image stored in an internal memory and a second type image stored in the nonvolatile memory device.

7. A method of operating a storage device including a storage controller and a nonvolatile memory device, the method comprising:
real-time analyzing a command received from a host immediately upon receiving the command from the host;
determining whether a current operating state of the storage device is suitable for performing the command;
operating the storage device using the current operating state if the current operating state of the storage device is suitable for performing the command, else changing the current operating state of the storage device; and
generating a result output and communicating the result output to the host.

8. The method of claim 7, wherein the changing of the current operating state of the storage device comprises:
selecting an optimal image from a plurality of images in response to the real-time analyzing of the command;

loading the optimal image into a programmable logic unit; and operating the storage device using the programmable logic unit after loading the optimal image, wherein the result output is generated after the operating of the storage device using the programmable logic unit after the loading of the optimal image.

9. The method of claim 8, wherein the real-time analyzing of the command is analyzing a pattern of the command, and the selecting of the optimal image from the plurality of images is made in response to the analyzing of the pattern of the command.

10. The method of claim 8, wherein at least one of the plurality of images is stored in the nonvolatile memory device.

11. The method of claim 8, wherein the changing of the current operating state of the storage device changes at least one of a power cutoff operation, a power supply voltage adjustment operation, an operating frequency adjustment operation, a randomizing operation, an error correction operation, and a compression operation.

12. The method of claim 8, wherein the storage device comprises a processor which controls the operation of the storage device and a nonvolatile memory device (NVM) controller which controls the operation of the nonvolatile memory device, and the changing of the current operating state of the storage device changes at least one of power consumption by the storage device and power consumption by the nonvolatile memory device in response to the optimal image.

13. The method of claim 8, wherein the selecting of the optimal image from the plurality of images is made further in response to the current operating state of the storage device.

14. The method of claim 7, wherein the storage device comprises a processor, and the changing of the current operating state of the storage device comprises:

selecting an optimal software image from a plurality of images in response to the real-time analyzing of the command;

loading the optimal software image into a programmable logic unit; and operating the processor using the programmable logic unit after loading the optimal image, wherein the result output is generated after operating the processor using the programmable logic unit after loading the optimal image.

15. The method of claim 7, wherein the storage device comprises a nonvolatile memory device (NVM) controller, and the changing of the current operating state of the storage device comprises:

selecting an optimal hardware image from a plurality of images in response to the real-time analyzing of the command;

loading the optimal hardware image into a programmable logic unit; and operating the NVM controller using the programmable logic unit after loading the optimal image, wherein the result output is generated after operating the NVM controller using the programmable logic unit after loading the optimal image.

16. A storage device comprising:

a nonvolatile memory device; and a storage controller which receives a command from a host and comprises:

an internal memory;

a programmable logic unit;

a processor configured to control operation of the storage device and access the internal memory; and a nonvolatile memory device (NVM) controller configured to control operation of the nonvolatile memory device, wherein the storage controller is configured to select an optimal image from a plurality of images in response to analyzing of a pattern of the command, and load the optimal image into the programmable logic unit, and the processor is further configured to control operation of the storage device in response to the optimal image.

17. The storage device of claim 16, wherein operation of the storage device after loading of the optimal image changes at least one of an error correction operation for data read from the nonvolatile memory device and a data compression operation for data read from the nonvolatile memory device.

18. The storage device of claim 16, further comprising an external memory directly connected to the programmable logic unit and storing at least one of the plurality of images.

19. The storage device of claim 16, wherein at least one of the plurality of images is stored in the nonvolatile memory device and the internal memory.

20. The storage device of claim 19, wherein the plurality of images includes a first type image stored in the internal memory and a second type image stored in the nonvolatile memory device, and the data volume of the first type image is smaller than a data volume of the second type image.

* * * * *